Sept 8, 1925.
J. E. CRADDICK
WAVE MOTOR
1,552,596
Original Filed May 21, 1923
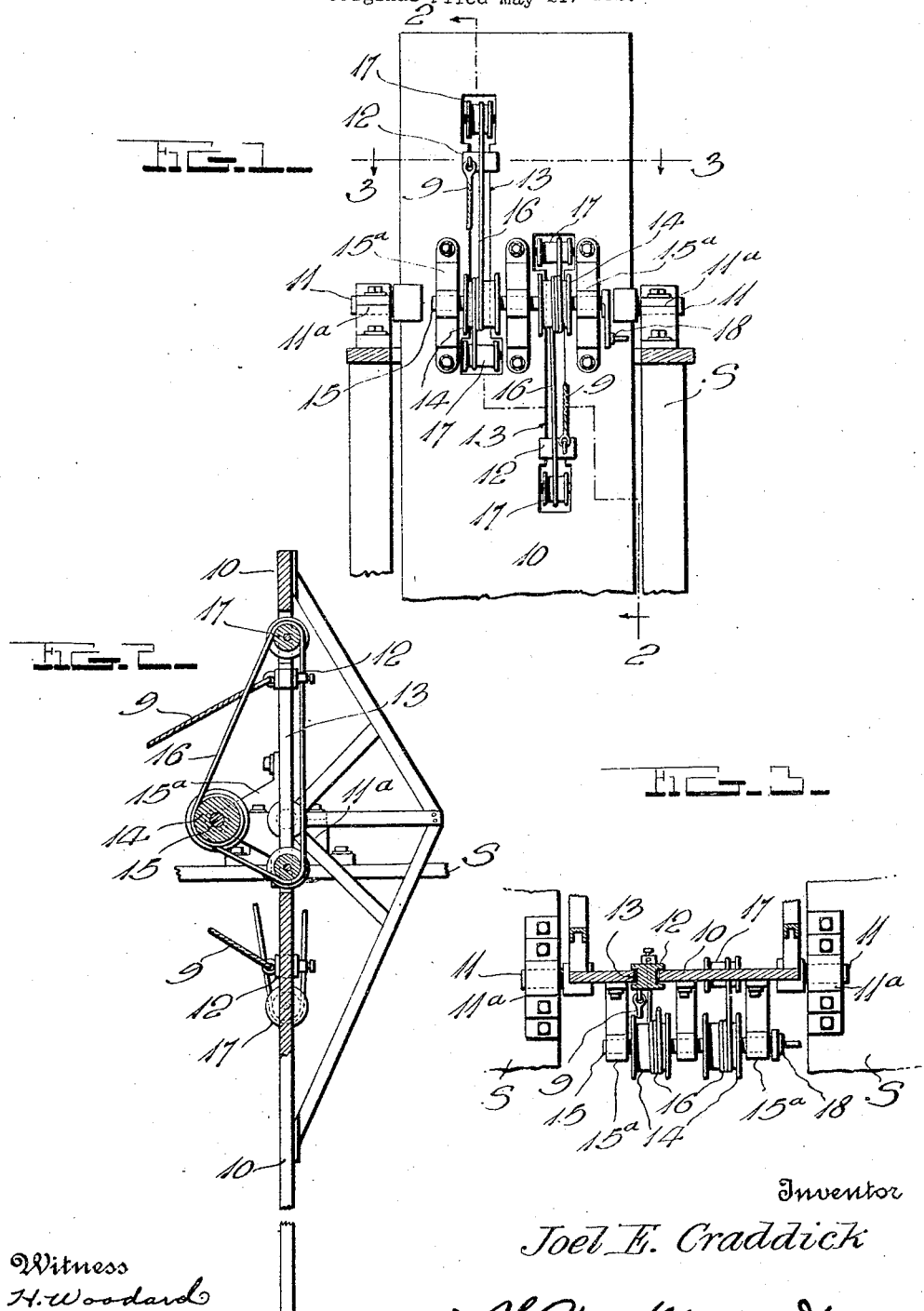

Patented Sept. 8, 1925.

1,552,596

UNITED STATES PATENT OFFICE.

JOEL E. CRADDICK, OF DENVER, COLORADO.

WAVE MOTOR.

Original application filed May 21, 1923, Serial No. 640,522. Divided and this application filed May 1, 1924. Serial No. 710,416.

*To all whom it may concern:*

Be it known that I, JOEL E. CRADDICK, a citizen of the United States, residing at Denver, in the county of Denver and State of Colorado, have invented certain new and useful Improvements in Wave Motors; and I do declare the following to be a full, clear, and exact description of the invention, such as will enable others skilled in the art to which it appertains to make and use the same.

This application forms a division of U. S. application, Serial No. 640,522, filed May 21, 1923, the present case being devoted to a wave motor comprising an oscillatory wave-operated paddle.

The paddle above referred to is adapted for connection by cables with an intermittent grip mechanism on a power shaft (not shown) so as to drive said shaft, and the primary object is to provide novel means whereby the cables may be readily adjusted on the paddle to obtain strokes of different lengths, according to the speed at which it is desired to drive the shaft.

With the foregoing in view, the invention resides in the novel subject matter hereinafter described and claimed, the description being supplemented by the accompanying drawing.

Figure 1 is a side elevation of the paddle, partly broken away.

Figure 2 is a vertical sectional view on line 2—2 of Fig. 1.

Figure 3 is a horizontal sectional view on line 3—3 of Fig. 1.

In the drawing above briefly described, S designates a support which may well be a portion of a wharf. Upon this support, is mounted a vertically disposed oscillatory paddle 10 having trunnions 11 between its upper and lower ends, mounted in suitable bearings 11ª. Above and below these trunnions, two cables 9 are shown which are adapted to lead to and operate an intermittent-grip, shaft-driving mechanism (not shown). In the preferred form of construction, the connections between the cables 9 and the paddle 10, are established by means of a pair of shoes 12 slidable along radial slots 13 or other guide-ways with which the paddle 10 is provided. It will thus be seen that the operative strokes of the cables may be varied to control the speed of the driven shaft, as moving the shoes 12 toward the pivotal axis of the paddle 10 will gradually bring the machine to a standstill, whereas outward adjustment of said shoes will increase the strokes of the cables. For adjusting the shoes 12, I mount drum means and co-acting cables on the paddle. In the construction shown, a pair of drums 14 are secured on a common horizontal shaft 15 which is rotatably mounted in appropriate bearings 15ª carried by the paddle 10. Suitable cables 16 are wound around the drums 14 and are connected with the shoes 12, suitable guiding rollers or the like 17 being provided at the ends of the guideways 13, around which the cables 16 pass. It will be understood from Figs. 1 and 2, that each of the cables 16 is continuous, and these cables are so wound upon the drums 14 that when the drum shaft 15 is turned in one direction, by means of a hand crank or the like 18, the shoes 12 will be simultaneously moved outward in the guideways 13 while turning of said shaft in the other direction will move the shoes inwardly. Obviously, any desired means may be employed for holding the drum shaft in adjusted position.

Attention may be directed to the fact that the drum shaft 15 is near the pivotal axis of the paddle 10. Thus, it has little oscillatory movement even when the paddle is swinging to the maximum, it being therefor an easy matter to grasp the handle 18 for adjustment of the cables 9.

As excellent results may be obtained from the details disclosed, they are preferably followed, but within the scope of the invention as claimed, numerous minor changes may be made.

I claim:

1. A machine of the class described comprising an oscillatory power-receiving member pivoted between its ends and having radial shoe guides at opposite sides of its pivotal axis, power transmitting shoes mounted for adjustment along said guides, cable guides at the ends of said shoe guides, a manually rotatable drum mounted on said member, and cables trained around said drum and said cable guides, said cables being connected to said shoes for adjusting the latter along their guides when the drum is rotated.

2. A machine of the class described comprising a vertically disposed power-receiving member having means between its upper and lower ends for pivotally supporting the member, said member having near one edge a vertical slot extending from a point below its pivotal axis substantially to the upper end of the member, and having near its other edge a downwardly extending slot whose upper end is slightly above said pivotal axis, a pair of power transmitting shoes slidably received in said slots, cable guiding rollers mounted in the ends of said slots, continuous cables trained around said rollers and secured to said shoes, a horizontal drum around which portions of said cables are oppositely wound, whereby to adjust said shoes when the drum is rotated, and supporting means for said drum carried by said member.

In testimony whereof I have hereunto affixed my signature.

JOEL E. CRADDICK.